(12) United States Patent
Bazerkanian (10) Patent No.: US 10,688,554 B2
(45) Date of Patent: Jun. 23, 2020

(54) NON-ROTATING WHEEL CAP

(71) Applicant: Harry Bazerkanian, Covina, CA (US)

(72) Inventor: Harry Bazerkanian, Covina, CA (US)

( * ) Notice: Subject to any disclaimer, the term of this patent is extended or adjusted under 35 U.S.C. 154(b) by 0 days.

(21) Appl. No.: 15/970,099

(22) Filed: May 3, 2018

(65) Prior Publication Data
US 2018/0272412 A1 Sep. 27, 2018

Related U.S. Application Data

(63) Continuation-in-part of application No. 14/932,161, filed on Nov. 4, 2015, now abandoned, which is a continuation-in-part of application No. 14/028,346, filed on Sep. 16, 2013, now Pat. No. 9,327,340.

(51) Int. Cl.
| | | |
|---|---|---|
| *B60B 7/20* | (2006.01) | |
| *B21D 53/32* | (2006.01) | |
| *B23P 15/00* | (2006.01) | |
| *B60B 7/04* | (2006.01) | |
| *B60B 7/14* | (2006.01) | |
| *G09F 21/04* | (2006.01) | |
| *B60B 7/06* | (2006.01) | |
| *B60B 7/00* | (2006.01) | |
| *B60B 7/08* | (2006.01) | |

(52) U.S. Cl.
CPC .............. *B21D 53/32* (2013.01); *B23P 15/00* (2013.01); *B60B 7/04* (2013.01); *B60B 7/066* (2013.01); *B60B 7/14* (2013.01); *B60B 7/20* (2013.01); *G09F 21/045* (2013.01); *B60B 7/004* (2013.01); *B60B 7/0053* (2013.01); *B60B 7/08* (2013.01); *B60B 2310/226* (2013.01); *B60B 2310/318* (2013.01); *B60B 2320/10* (2013.01); *B60B 2900/112* (2013.01)

(58) Field of Classification Search
CPC ........... B60B 7/0053; B60B 7/20; B60B 7/04; B60B 7/004; B60B 2310/30; B60B 2310/318; B60B 2310/226; B60B 2900/112; B60B 2320/10; B60B 7/0013; B21D 53/32; G09F 21/04; G09F 21/045; Y10T 29/4954; Y10T 29/49542
See application file for complete search history.

(56) References Cited

U.S. PATENT DOCUMENTS

| | | |
|---|---|---|
| 710,195 A | 9/1902 | Jones |
| 2,014,058 A | 9/1935 | Tonai |
| 2,130,220 A | 9/1938 | Ball |
| 2,169,237 A | 8/1939 | Gasco |
| 2,548,070 A | 4/1951 | Ryan |
| 2,869,262 A | 1/1959 | Lucas |
| 4,388,771 A | 6/1983 | Lalonde |

(Continued)

*Primary Examiner* — Jun S Yoo
(74) *Attorney, Agent, or Firm* — Kenneth L. Green; Averill & Green (57) ABSTRACT

Apparatus and method for assembling a non-rotating wheel cap. A bearing is seated in either an outer disk of an inner disk as a first assembly step. A weight is in the form of an arc between 90 and 110 degrees and resides in a pocket formed in the outer disk. An adapter disk is attachable to the inner disk to allow customizing for various wheel fitment. A center ornamental portion may be a custom part or may be cut from an original fixed wheel center cap is cut from the fixed center cap, and attached to the outer disk converting the fixed center cap to a non-rotating center cap.

13 Claims, 9 Drawing Sheets

(56) References Cited

U.S. PATENT DOCUMENTS

| | | | |
|---|---|---|---|
| 4,678,239 A | 7/1987 | Matsushita | |
| 4,781,419 A | 11/1988 | Boothe | |
| 5,190,354 A | 3/1993 | Levy et al. | |
| 5,490,342 A | 2/1996 | Rutterman et al. | |
| 5,588,715 A | 12/1996 | Harlen | |
| 5,623,777 A | 4/1997 | Hsiao | |
| 5,659,989 A | 8/1997 | Hsiao et al. | |
| 5,957,542 A | 9/1999 | Boothe et al. | |
| 6,045,195 A | 4/2000 | Okamoto | |
| 6,536,848 B1 | 3/2003 | Goodman | |
| 6,554,370 B2 | 4/2003 | Fowlkes | |
| 6,637,830 B1 | 10/2003 | Burgess | |
| 6,848,751 B1 * | 2/2005 | Yuan | B60B 7/20 301/37.107 |
| 7,036,891 B2 | 5/2006 | Chen | |
| 7,121,631 B2 | 10/2006 | Strzelezyk | |
| 7,204,561 B2 | 4/2007 | Iwasaki | |
| 2006/0208559 A1 * | 9/2006 | Morris | B60B 7/20 301/37.25 |
| 2007/0199220 A1 * | 8/2007 | DoVale, Jr. | G09F 21/045 40/587 |
| 2012/0193803 A1 | 8/2012 | Yoshino | |

\* cited by examiner

NON-ROTATING WHEEL CAP

CROSS-REFERENCE TO RELATED APPLICATIONS

The present application is a Continuation In Part of U.S. patent application Ser. No. 14/028,346 filed Sep. 16, 2013, and a Continuation In Part of U.S. patent application Ser. No. 14/932,161 filed Nov. 4, 2015, which applications are incorporated in their entirety herein by reference.

BACKGROUND OF THE INVENTION

The present invention relates to automotive wheel caps, and more particularly to a method for constructing a non-rotating wheel cap by modifying a fixed wheel cap and attaching a fixed bearing retainer and attaching an offset weight non-rotating cap to a bearing held by the fixed bearing retainer.

Jones, U.S. Pat. No. 710,195 describes an advertising display device adapted to be applied to vehicle-wheels and is supported on the wheel in such manner as to be stationary or non-rotating with respect to the vehicle, whereby the advertising matter displayed on the device will always be in position for proper display and inspection not withstanding the rotation of the wheel.

Tonai, U.S. Pat. No. 2,014,058 describes an invention that related to hub caps and its general object is to provide a hub cap primarily designed for the wheels of motor vehicles, that includes a name plate which is mounted so as to not rotate with the wheel and therefore remains substantially stationary, with the result it not only adds materially to the ornamentality of the wheel, but the name on the plate can be distinguished while the vehicle is in motion.

Gasco, U.S. Pat. No. 2,169,237 describes a stationary ornament for wheel hubcaps in such a manner that the ornament remains in a stationary position while the wheel is rotating by the vehicle traveling in a forward direction. In this type of construction the nameplate is mounted on the wheel or wheel hubcap by a free running or anti-friction bearing of some type.

Ryan, U.S. Pat. No. 2,548,070 describes an improved advertising display device adapted for use on motor vehicles. This invention is comprised of a sign carrying member having imprinted on one side thereof media or indicia, which said member is especially adapted for attachment to a non-rotatable axle of a motor vehicle in rotatably mounted on said axle. It provides an advertising display device for use on motor vehicle of various types, such as trucks, taxicabs, buses or the like.

Lucas, U.S. Pat. No. 2,869,262 describes improvements in wheel-supported advertising signs, and its principal object is to provide a convenient means for attaching an advertising sign to the hub cap of an automobile wheel in such a manner that the advertising sign is held against revolving movement while the wheel rotates, and which presents its advertising material in readable position at all times. This invention provides an anchoring means or adapter for the sign centrally of the hub cap and arranged in such a manner that it takes up little space for accommodation in relatively small tolerances between the cap and an axle extending into the same.

Matsushita, U.S. Pat. No. 4,678,239 describes a hub cap assembly having a non-rotating wheel cover consisting of a disc like body on which indicia, advertising material, trademarks and the like can be placed. The cover body is provided with a weight on its back surface acting to normally maintain the cover in a given orientation and is held on an outer bracket fitted with an annular bearing at its center and radially extending spokes through which the cover body is attached. An annular bearing is located within the annular center of the outer flange and is resiliently attached to the central boss portion of an inner bracket. The inner bracket being provided with a plurality of radial stays having a V-shaped clip at its end adapted to engage with the rim portion of the wheel.

Boothe, U.S. Pat. No. 47,814 describes a hub cap locking arrangement, in which, in a first embodiment, a hub cap having a cup-shaped configuration with a generally tubular portion insertable into the wheel hub opening, the tubular portion having a diameter slightly smaller than the diameter of the wheel hub opening of an alloy vehicle wheel. The hub cap may be formed from cast or machined metal or plastic material and is provided with a plurality of radially extending threaded apertures, through which extend pointed threaded members of high strength metal, the threaded members having either a hex head opening or a slotted end.

Levy et al., U.S. Pat. No. 5,190,354 describes a wheel cover for the wheel of a vehicle, comprising a securement and support device secured to the hub or to the rim of the wheel and a substantially flat shield element, mounted on the device for rotation and having an asymmetric spacing of its mass relative to its axis of rotation, permitting the shield element to maintain a fixed angular position relative to the horizontal, even during rotation of the wheel.

Rutterman et al., U.S. Pat. No. 5,490,342 describes a wheel cover for mounting on a wheel rim comprising a base member having a disc member rotatably mounted thereto to display an indicia thereon, the base member and disc member each includes stabilizing structure configured to mate with each other to maintain concentric alignment and restrict oscillation of the disc member relative to the base member and a counterweight attached to the disc member such that as the base member rotates with the wheel rim. The disc member does not rotate relative to the vehicle so that the indicia on the disc member can be viewed as the vehicle translates over the supporting surface.

Harlen, U.S. Pat. No. 5,588,715 describes a non-rotatable wheel cover assembly including a mounting assembly for mounting the wheel cover directly to a wheel-supporting member of a vehicle. The wheel cover has inner and outer surfaces and the wheel-supporting member is disposed for supporting wheels of the vehicle during rotation thereof. The mounting assembly includes a first attaching element mounted on the inner surface of the wheel cover and a wheel cover support assembly for secured relation of the first attaching element and the wheel supporting member. The wheel cover support assembly is disposed for non-rotational support of the first attaching element and the wheel cover during rotation of the wheel.

Boothe et. al, U.S. Pat. No. 5,957,542, disclosed a non-rotating wheel cover attached using a mounting base held inside a wheel by three radially extending screws. Access to the screws requires removing the wheel from the vehicle, thus providing an anti-theft feature. However, the non-rotating wheel cover of the '542 patent requires several machined parts and is somewhat expensive to manufacture, and is sized to individual wheels.

The prior art thus teaches a variety of weighted wheel covers for the purpose of fixed orientation during wheel rotation. However, the prior art does not teach a method for constructing an inexpensive non-rotating cap suitable for various wheel sizes.

Further, the weights used by the prior art are either very short angular extent (see Ball, U.S. Pat. No. 2,130,220) or long angular extend (see Levy, U.S. Pat. No. 5,190,354). Neither the short nor the long angular extent provides a stable non-rotating cap. Weights with long angular extent have tended to build angular inertia and rotate even after a vehicle stops moving, and weights with short angular extent tend to rotate with the wheel due to drafting.

The prior art also discloses a weight held in place on flat surface by adhesive or double sided tape. Unfortunately, in the environment the non-rotating caps must survive in has resulted in the weights loosening and eventually falling out of place, both destroying the function of the non-rotating cap, and creating safety issues.

Further, due to the many various wheel designs, a large variety of non-rotating caps has been required.

BRIEF SUMMARY OF THE INVENTION

The present invention addresses the above and other needs by providing an apparatus and method for assembling a non-rotating wheel cap. A bearing is seated in either an outer disk of an inner disk as a first assembly step. A weight is in the form of an arc between 90 and 110 degrees and resides in a pocket formed in the outer disk. An adapter disk is attachable to the inner disk to allow customizing for various wheel fitment. A center ornamental portion may be a custom part or may be cut from an original fixed wheel center cap is cut from the fixed center cap, and attached to the outer disk converting the fixed center cap to a non-rotating center cap.

In accordance with one aspect of the invention, there is provided a method for assembling a non-rotating center cap, the method including: obtaining an outer disk having a passage through the outer disk, a step in the passage near an outer passage end, and an outward facing face; obtaining in inner disk having a closed back surface, an inner disk post centered on the closed back face and extending out from the closed back face, a cylindrical wall extending out from a periphery of the close back surface defining a recessed volume, and features outside the wall configured to attach the inner disk to a wheel inside a wheel center; inserting a bearing, into the passage through the outer disk, and against a fixed step in the passage; seating an inside retaining ring in the passage behind the bearing to retain the bearing in the passage against the passage bearing seat; sliding the outer disk over the inner disk post and against a second step; seating an outside retaining ring over the post to retain the outer disk on the inner disk; obtaining an ornamental disk; and attaching an ornamental disk to the face of the outer disk.

In accordance with another aspect of the invention, there is provided a weight in the form of an arc between 90 and 110 degrees. The angular extend of the arc was determined after extensive experimentation to prevent or reduce rotation after a vehicle stops moving and rotation with the wheel due to drafting.

In accordance with yet another aspect of the invention, there is provided a non-rotating center cap easily adapted to various wheels. A simple adapter disk is attachable to an inner disk of the non-rotating center cap. The adapter disk is easily machined for various wheels and greatly reduces inventory requirements.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
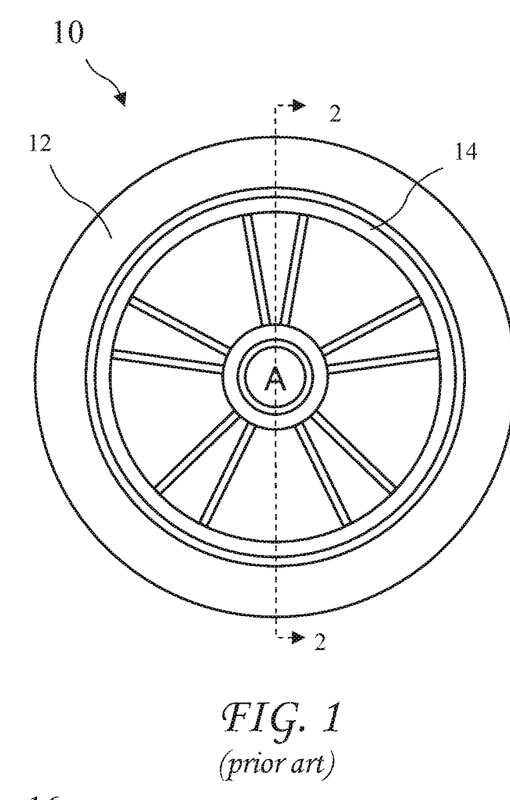
FIG. 1 is a front view of a prior art vehicle wheel and tire.
Figure 2:
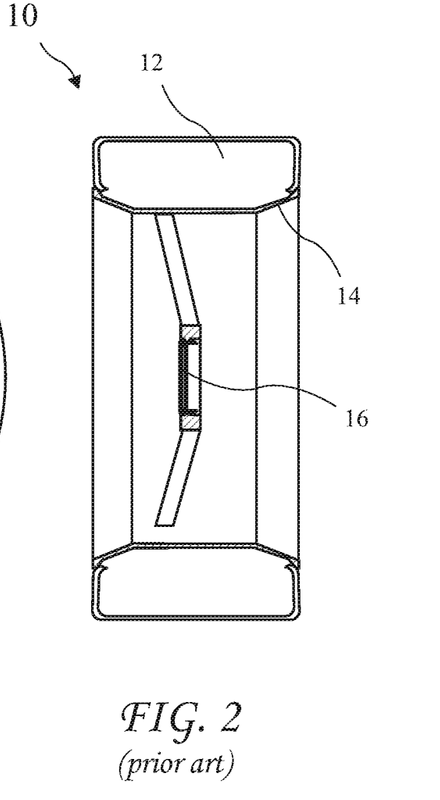
FIG. 2 is a cross-sectional view of a prior art vehicle wheel and tire taken along line 2-2 of FIG. 1.

A front view of a prior art vehicle wheel 14 and tire 12 assembly 10 is shown in FIG. 1 and a cross-sectional view of a prior art vehicle wheel and tire taken assembly 10 along line 2-2 of FIG. 1 is shown in FIG. 2. The wheel 14 includes a prior art ornamental removable wheel cap 16 residing in the center of the wheel 14.

Figure 3A:
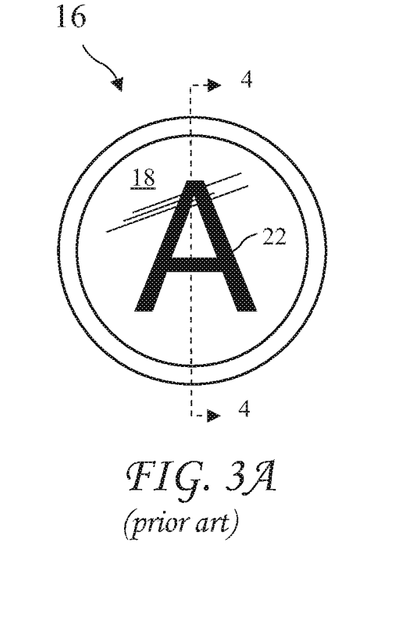
FIG. 3A is a front view of a prior art wheel cap.
Figure 3B:
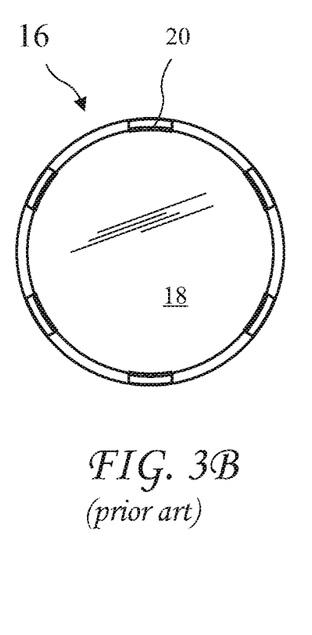
FIG. 3B is a rear view of the prior art wheel cap.
Figure 4:
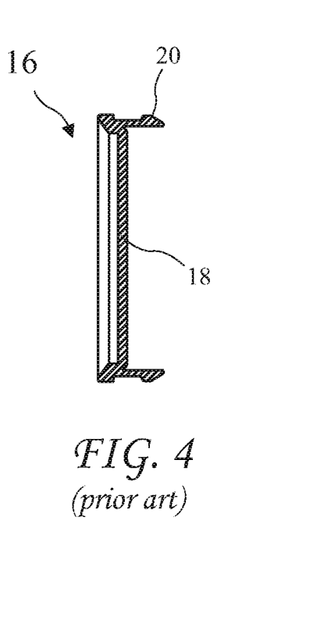
FIG. 4 is a cross-sectional view of the prior art wheel cap taken along line 4-4 of FIG. 3A.

A front view of the original wheel cap 16 is shown in FIG. 3A, a rear view of the original wheel cap 16 is shown in FIG. 3B, and a cross-sectional view of the wheel cap 16 taken along line 4-4 of FIG. 3A is shown in FIG. 4. The original wheel cap 16 includes a face 18 which may include an ornamental design 22, for example, a design associated with the vehicle the wheel is used on, or a manufacturer of custom wheels. The original wheel cap 16 further includes attaching features for attaching the original wheel cap 16 to the wheel 14. The attaching features may be tabs 20 angularly spaced apart around the perimeter of the original wheel cap 16 allowing the original wheel cap 16 to snap into the wheel 14, and allowing removal of the original wheel cap 16 from the wheel 14. In some instances, the face 18 may include a passage for attaching a fixed emblem.

Figure 5:
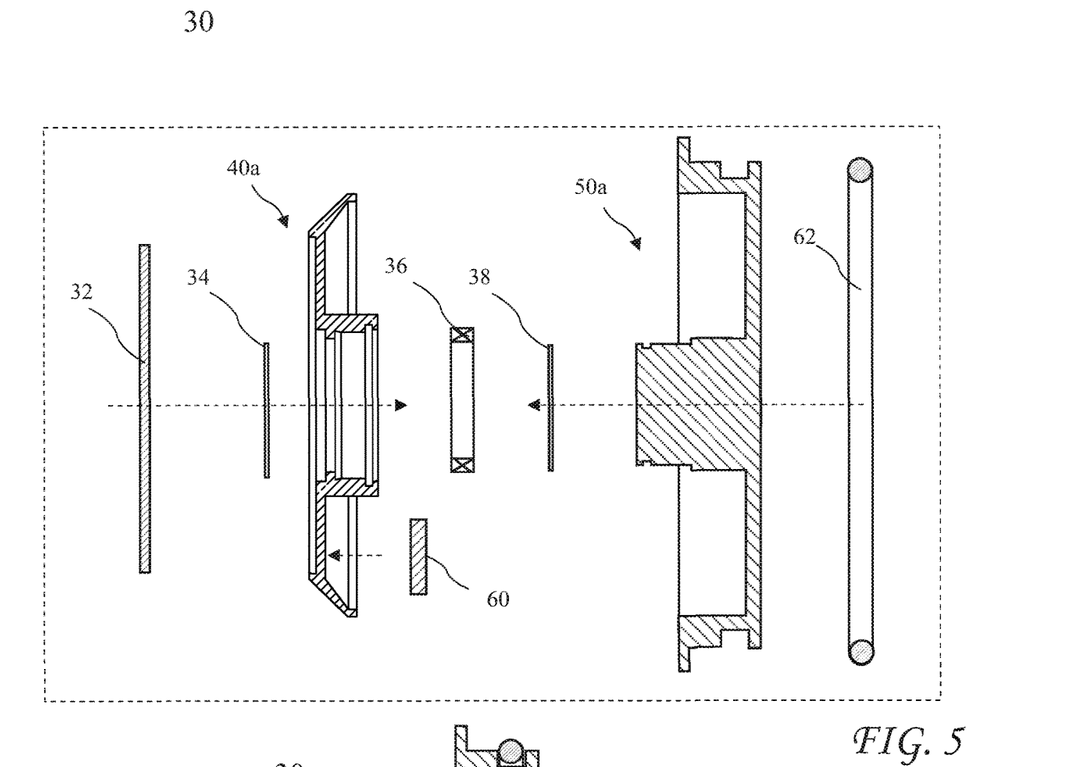
FIG. 5 is an exploded cross-sectional view of a non-rotating wheel cap according to the present invention.
Figure 6:
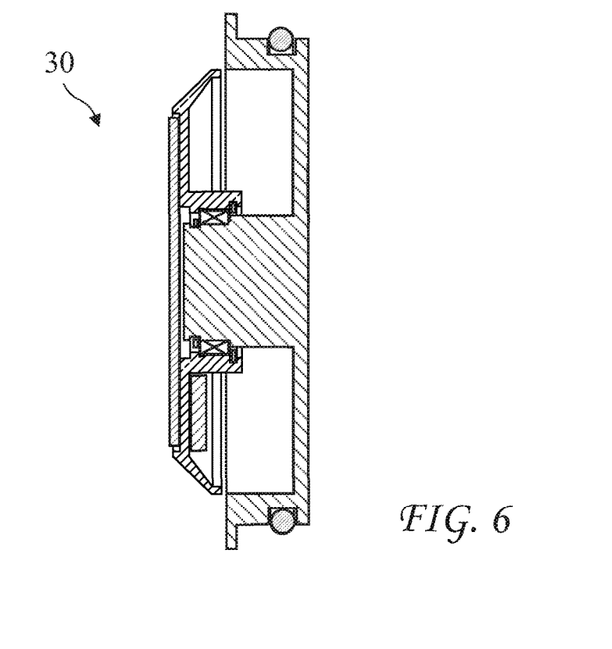
FIG. 6 is an assembled view of the non-rotating wheel cap according to the present invention.

An exploded cross-sectional view of a non-rotating wheel cap 30 according to the present invention is shown in FIG. 5 and an assembled view of the non-rotating wheel cap is shown in FIG. 6. The non-rotating wheel cap 30 includes an ornamental disk 32, an outside locking ring 34, an outer disk 40, a bearing 36, an inside locking ring 38, an inner disk 50a, a weight 60, and an O-Ring 62. The non-rotating wheel cap 30 is assembled as described in FIG. 11.

Figure 7:
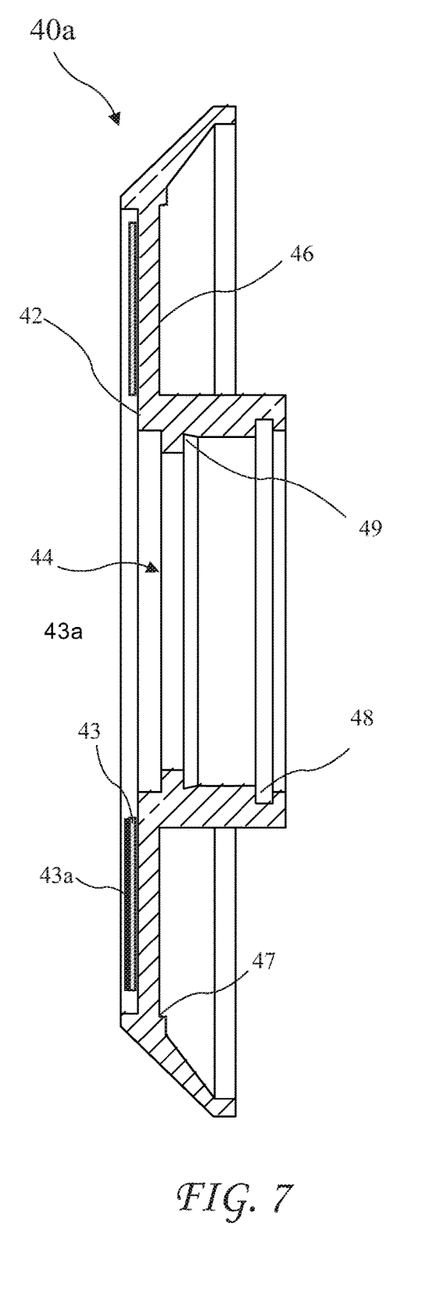
FIG. 7 shows a detailed view of an outer disk of the non-rotating wheel cap according to the present invention.

A detailed view of the outer disk 40a is shown in FIG. 7. The outer disk 40a includes a face 42, a layer of tape 43 on the face 42, the layer of tape 43 having an adhesive on an outer surface and preferably a removable release layer 43a over the adhesive, a through passage 44, a back surface 46, a weight positioning step 47, an inside ring retaining groove 48, and a forward bearing step 49. While the step 49 is shown to retain a bearing inserted into the passage 44 from the rear, the step 49 may also be forward facing and near the rearward end of the passage 44, the inside ring retaining groove 48 may be near the forward end of the passage 44, and the bearing may be inserted from the forward end of the passage 44.

Figure 8:
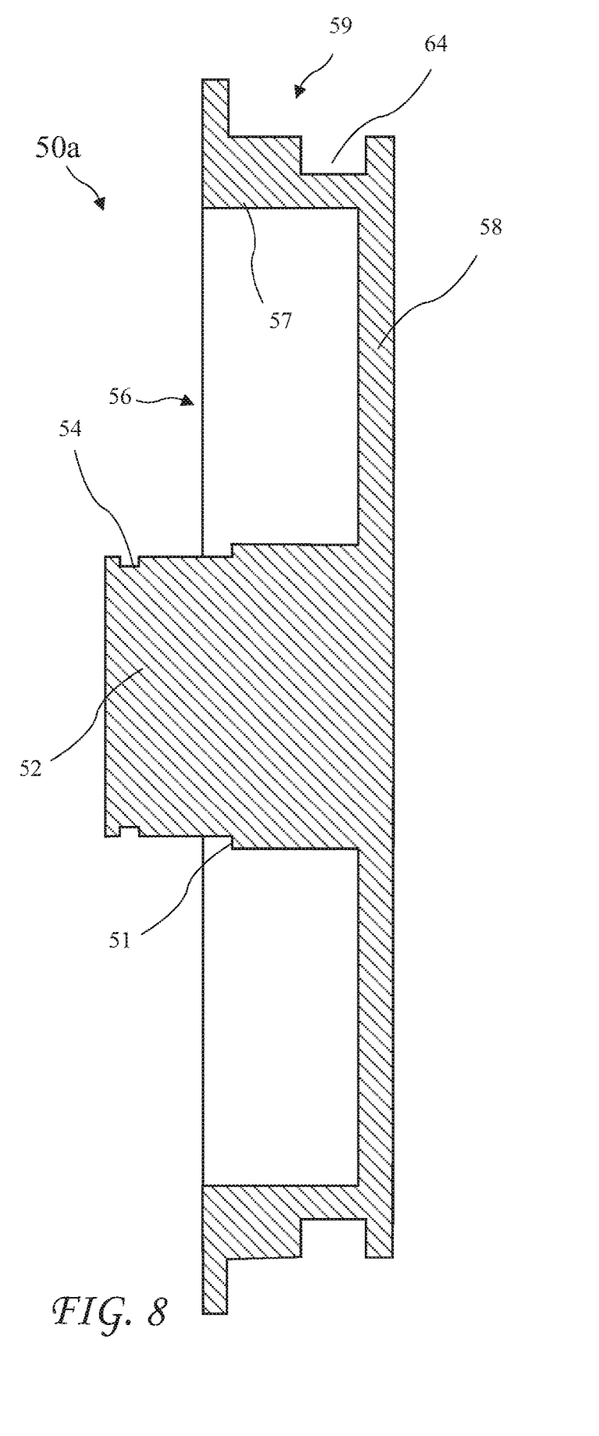
FIG. 8 shows a detailed view of an inner disk of the non-rotating wheel cap according to the present invention.

FIG. 8 shows a detailed view of the inner disk 50a of the non-rotating wheel cap 30. The inner disk 50a includes an outward reaching post 52 an outside ring retaining groove 54, a volume 56, a cylindrical wall 57, a back 58, an outer radius 59, and attaching features outside the cylindrical wall 57. A step 51 on the post 52 positions the bearing 36 on the post 52.

Figure 9:
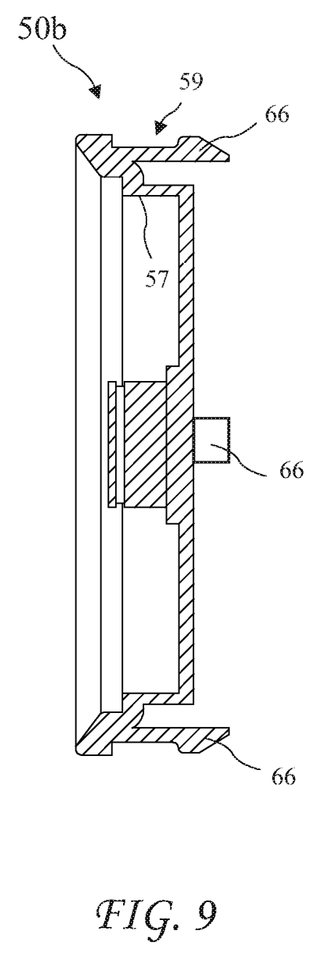
FIG. 9 shows a second embodiment of the inner disk according to the present invention.

A second embodiment of the inner disk 50b is shown in FIG. 9. The inner disk 50b includes at least three fingers 66 and preferably six fingers 66, to engage a wheel to retain the non-rotating wheel cap 30.

Figure 10:
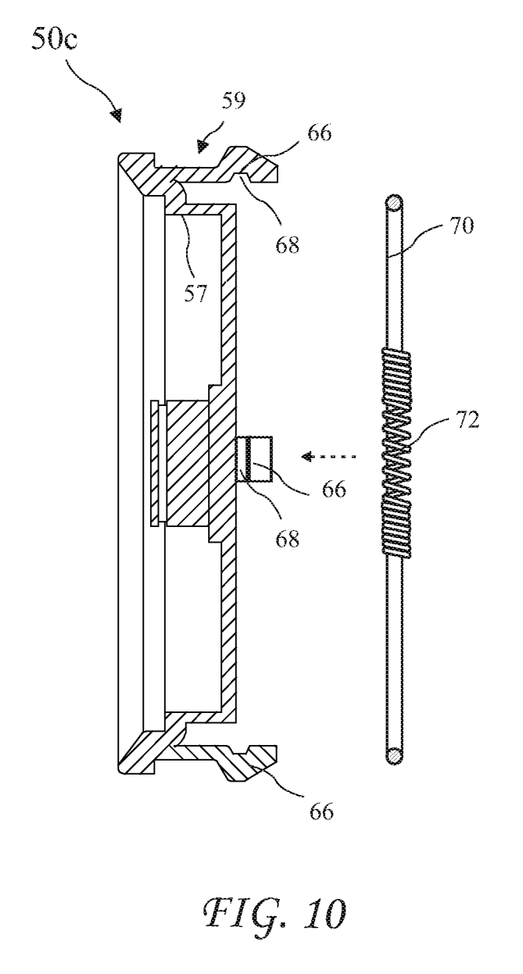
FIG. 10 shows a third embodiment of the inner disk according to the present invention.

A third embodiment of the inner disk 50c is shown in FIG. 10. The inner disk 50c includes the fingers 66 to engage a wheel to retain the non-rotating wheel cap 30, and each finger 66 includes an inside notch 68 which receive an expanding ring 70. The expander ring 70 includes a spring 72 to maintain radial force on the fingers 66.

Figure 11:
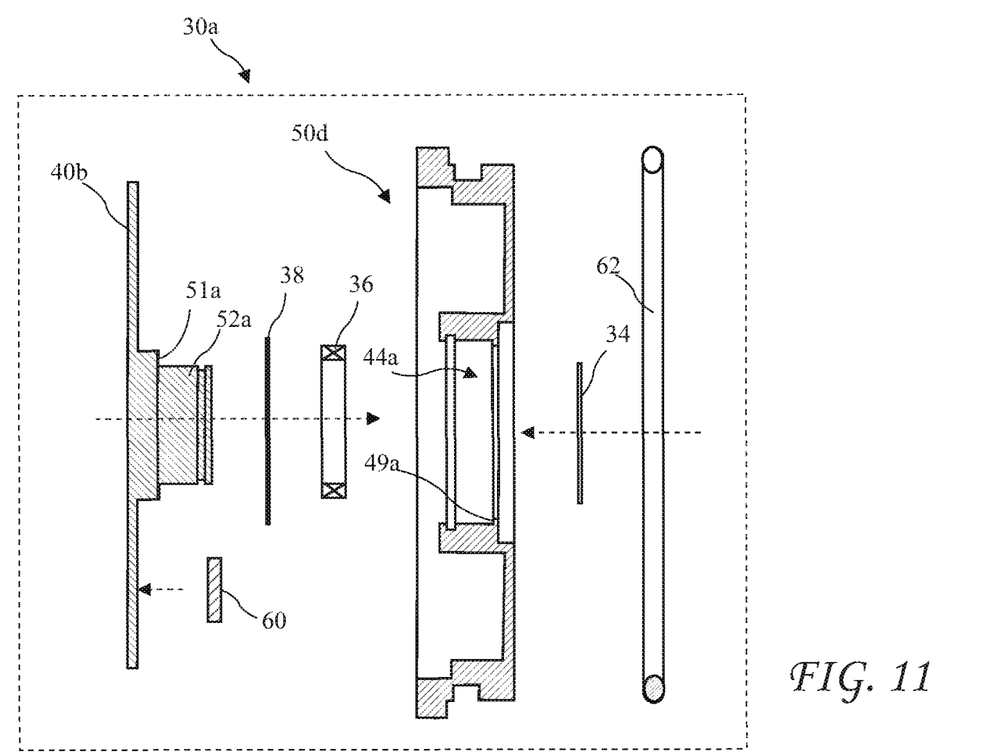
FIG. 11 is an exploded cross-sectional view of a second non-rotating wheel cap according to the present invention.
Figure 12:
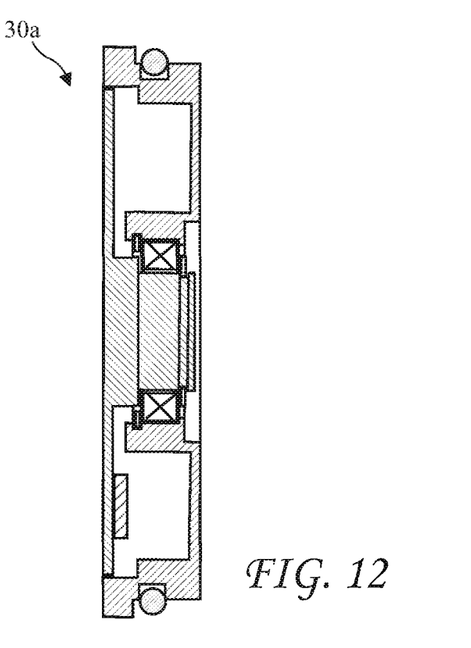
FIG. 12 is an assembled view of the second non-rotating wheel cap according to the present invention.

An exploded cross-sectional view of a second non-rotating wheel cap 30a is shown in FIG. 11 and an assembled view of the second non-rotating wheel cap 30a is shown in FIG. 12. The non-rotating cap 30a is assembled from a second outer disk 40b, an inside locking ring 38, a bearing 36, a fourth inner disk 50d, an outside locking ring 34, and O-ring 62, and a weight 60. The assembly of the non-rotating wheel cap 30a is described in FIG. 14. A fourth inner disk 50d includes steps 49a in the passage 44a, and 51a on the post 52a, for positioning the bearing 36 in the inner disk 50d, and for positioning the outer disk 40b in the bearing 36.

Figure 13:
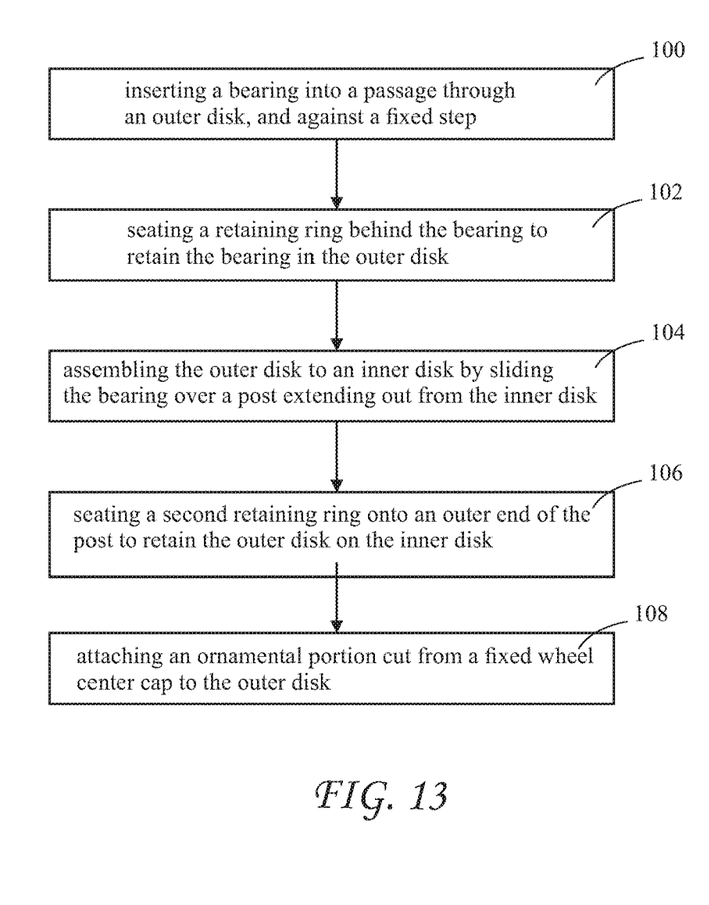
FIG. 13 shows a first method for constructing the floater cap assembly according to the present invention.

FIG. 13 shows a method for constructing the floater cap assembly. The method includes: inserting a bearing, into a assembly through an outer disk, and against a fixed step at step 100; seating a retaining ring behind the bearing to retain the bearing in the outer disk at step 102; assembling the outer disk to an inner disk by sliding the bearing over a post extending out from the inner disk at step 104; seating a second retaining ring onto an outer end of the post to retain the outer disk on the inner disk at step 106; and attaching an ornamental portion cut from a fixed wheel center cap to the outer disk at step 108.

The bearing may be inserted into the passage from the front or rear, and is preferably inserted from the rear.

Figure 14:
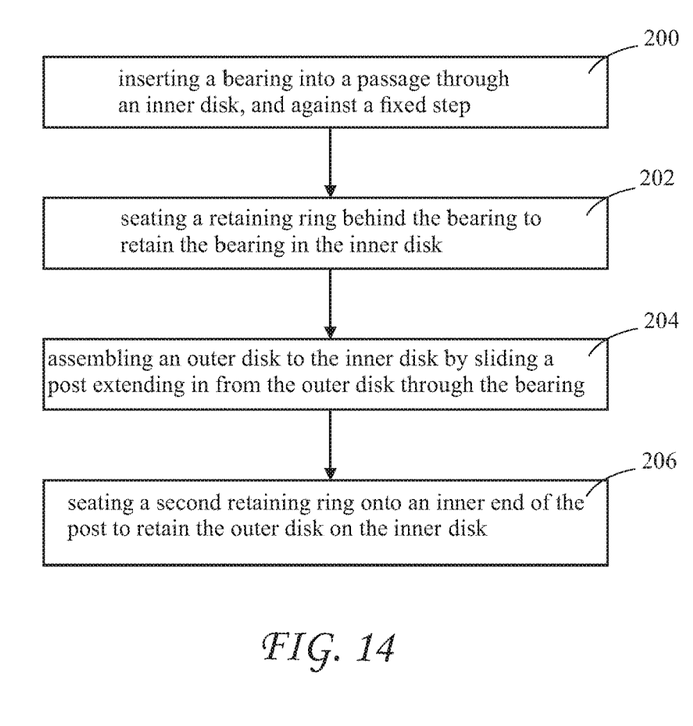
FIG. 14 shows a second method for constructing the floater cap assembly according to the present invention.

FIG. 14 shows a method for constructing the second floater cap assembly 50a. The method includes: inserting a bearing into a passage through an inner disk, and against a fixed step at step 200; seating a retaining ring behind the bearing to retain the bearing in the inner disk at step 202; assembling an outer disk to the inner disk by sliding a post extending in from the outer disk through the bearing at step 204; seating a second retaining ring onto an inner end of the post to retain the outer disk on the inner disk at step 206.

Figures 15, 16, 17A, 17B:
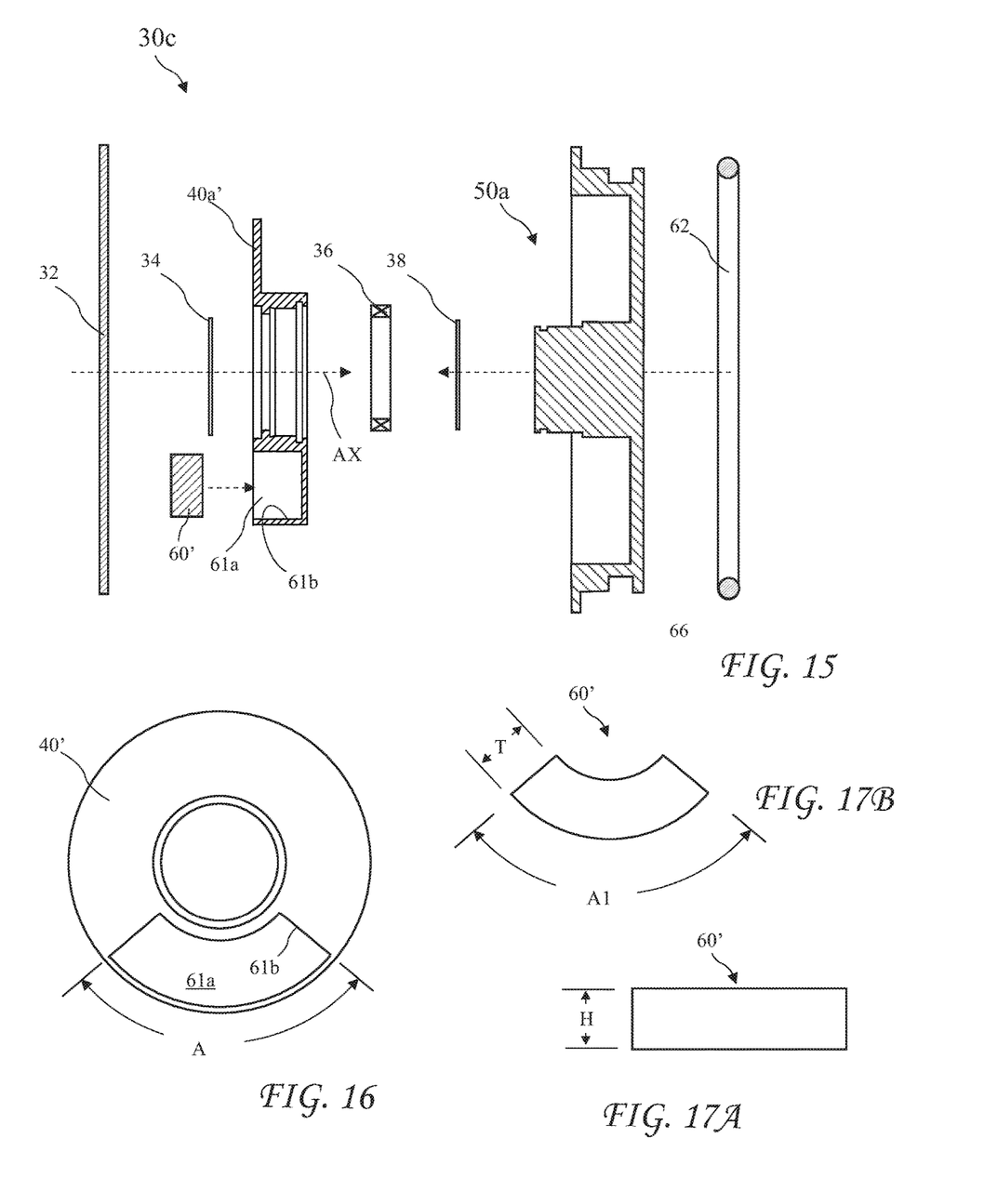
FIG. 15 shows a cross-sectional view of a variation of the first embodiment of a non-rotating wheel cap according to the present invention having a pocket for a weight.
FIG. 16 shows a front view of the outer disk of the first embodiment according to the present invention having the pocket for the weight.
FIG. 17A shows a side view of the weight according to the present invention.
FIG. 17B shows a top view of the weight according to the present invention.

A cross-sectional view of a variation of the first embodiment of a non-rotating wheel cap 30c having a pocket 61a for a weight 60' is shown in FIG. 15 and a front view of an outer disk 40a' of the non-rotating wheel cap 30c is shown in FIG. 16. The non-rotating wheel cap 30c is similar to the non-rotating wheel cap 30, with the exception of the pocket 61a having walls 61b circumferentially surrounding the weight 60'. The pocket 61a forms an arc A of preferably between 90 and 110 degrees, and more preferably about 100 degrees. An axial position of the bearing 36 at least partially overlaps an axial depth in the axial dimension AX of the pocket 61a, as seen by the pocket 61a residing directly below the bearing location (i.e., not axially outside or inside) providing a shallow wheel cap 30c suitable for many applications.

A side view of the weight 60' is shown in FIG. 17A and a top view of the weight 60' in FIG. 17B. The weight 60' fits inside the pocket 61a and may be held in place by an adhesive, double sided tape, or mechanical fasteners, for example screws. The weight 60' is in the form of an arc having angular extent A1 of preferably between 90 and 110 degrees, and more preferably about 100 degrees, a height H of preferably about 0.25 inches and a thickness T of about 0.3 inches, and is preferably made from lead or a material having similar weight.

Figures 18, 19:
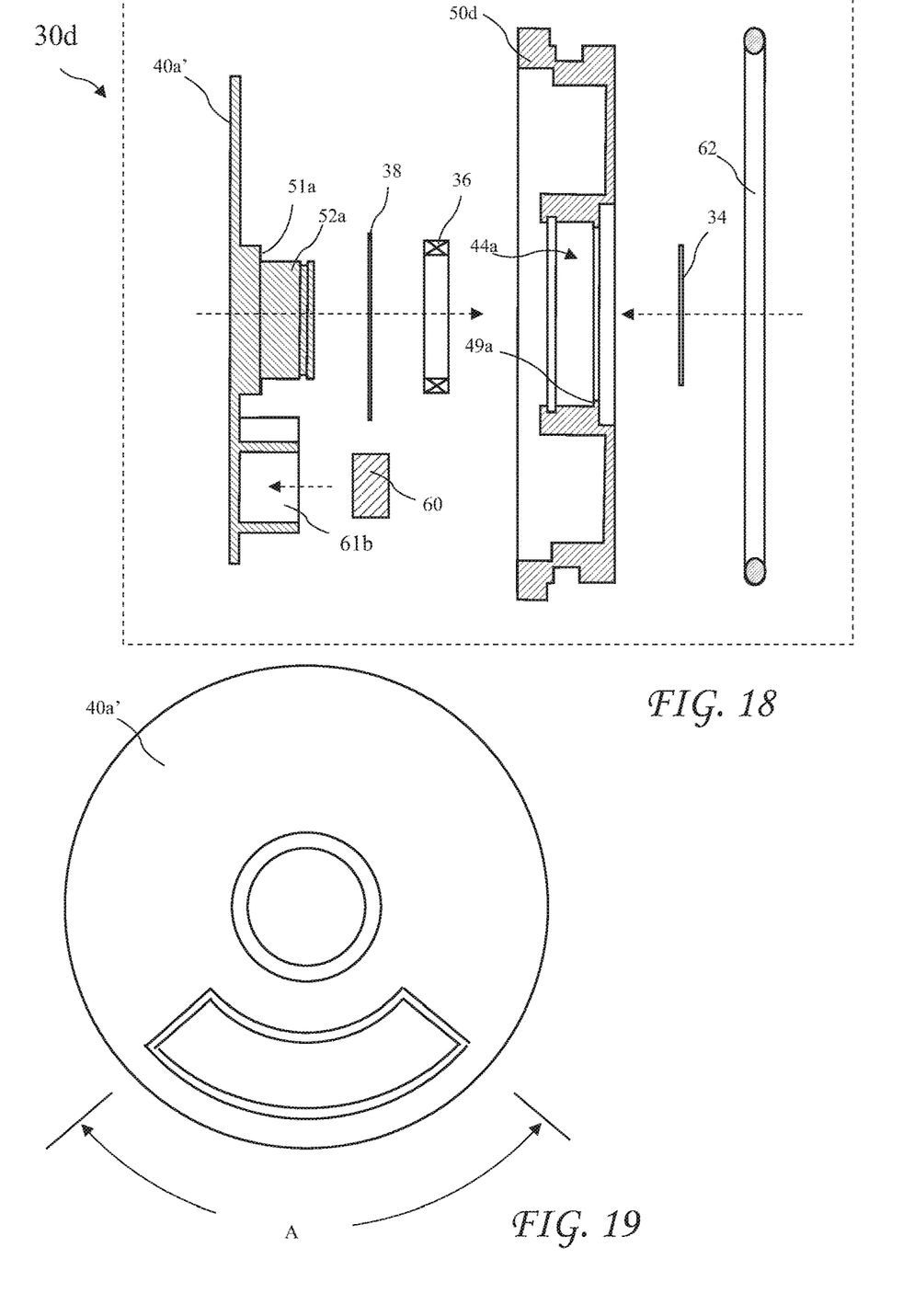
FIG. 18 shows a cross-sectional view of a variation of the second embodiment of a non-rotating wheel cap according to the present invention having the pocket for a weight.
FIG. 19 shows a rear view of the outer disk of the second embodiment according to the present invention having the pocket for a weight.

A cross-sectional view of a variation of the second embodiment of a non-rotating wheel cap 30d having a pocket 61b for the weight 60' is shown in FIG. 18, and a rear view of an outer disk 40a' of the non-rotating wheel cap 30d is shown in FIG. 19. The non-rotating wheel cap 30d is similar to the non-rotating wheel cap 30a and the pocket 61b has the same dimensions as the pocket 61a. The weight 60' fits inside the pocket 61b and may be held in place by an adhesive, double sided tape, or mechanical fasteners, for example screws.

Figure 20:
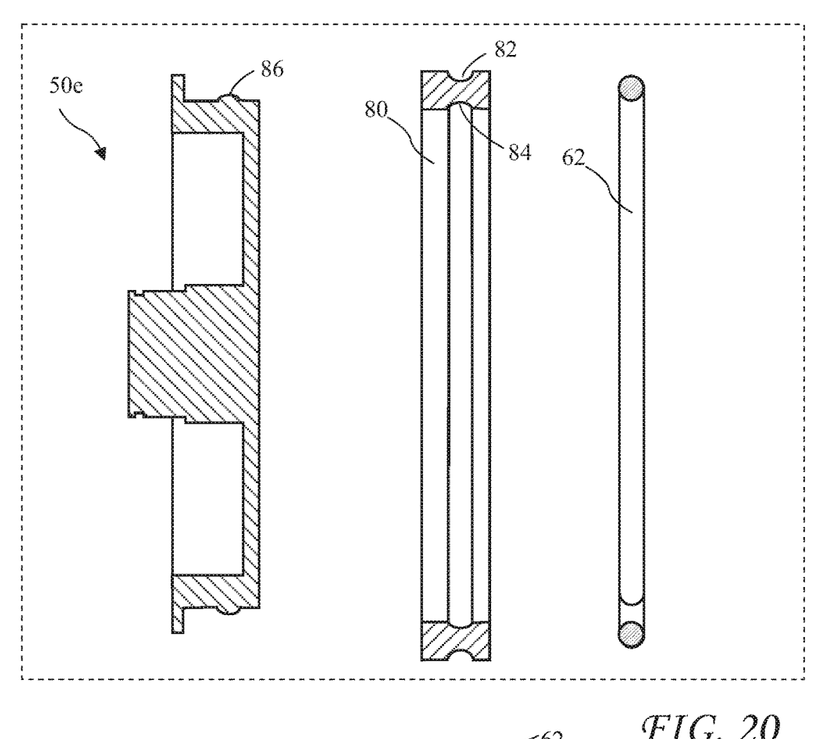
FIG. 20 shows an inner disk and adapter according to the present invention.
Figure 21:
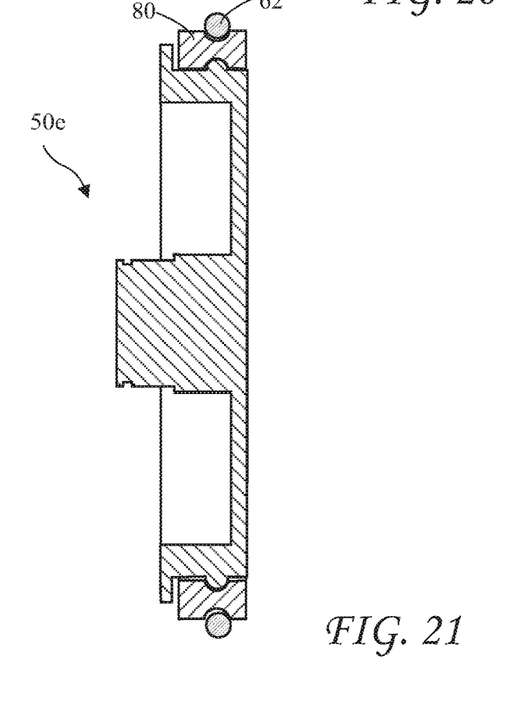
FIG. 21 shows the adapter attached to the inner disk according to the present invention.

An inner disk 50e and adapter disk 80 are shown separated in FIG. 20 and the adapter disk 80 is shown attached to the inner disk 50e in FIG. 21. The adapter disk 80 may be retained on the inner disk 50e by cooperation of an annular ridge 86 and an annular groove 84, by an interference fit, by adhesive, or mechanical fasteners, for example, screws. The adapter disk 80 may include an annular O-Ring groove for an O-ring 62 or the adapter disk 80 may be oversized to allow machining for an interference fit to various wheels. The use of the adapter disk 80 reduces inventory requirements, While the invention herein disclosed has been described by means of specific embodiments and applications thereof, numerous modifications and variations could be made thereto by those skilled in the art without departing from the scope of the invention set forth in the claims.

I claim:

1. A non-rotating wheel cap, comprising:
an inner disk attachable to a wheel;
an outer disk rotatably attached to the inner disk;
a pocket of the outer disk;
a weight attachable inside the pocket, the weight having the shape of an arc between 90 and 110 degrees; and
an ornamental disk attached to an outer surface of the outer disk,
wherein:
the inner and outer disks are connected by a bearing allowing the outer disk to spin with respect to the inner disk; and
an axial position of the bearing at least partially overlaps an axial depth of the pocket.

2. The non-rotating wheel cap of claim 1, wherein the weight has the shape of an arc of about 100 degrees.

3. The non-rotating wheel cap of claim 1, wherein the weight has a height H of about 0.25 inches and a thickness T of about 0.3 inches.

4. The non-rotating wheel cap of claim 3, wherein the weight is made of lead.

5. The non-rotating wheel cap of claim 1, wherein the pocket has the same shape as the weight.

6. The non-rotating wheel cap of claim 1, wherein the pocket circumferentially surrounds the weight.

7. The non-rotating wheel cap of claim 6, wherein the weight in attached to the pocket by adhesive.

8. The non-rotating wheel cap of claim 6, wherein the weight in attached to the pocket by double sided tape.

9. The non-rotating wheel cap of claim 6, wherein the weight in attached to the pocket by mechanical fasteners.

10. The non-rotating wheel cap of claim 1, wherein the pocket is open to the front of the outer disk.

11. The non-rotating wheel cap of claim 1, wherein the pocket is open to the rear of the outer disk.

12. The non-rotating wheel cap of claim 1, further including an adapter disk attachable to the inner disk, the adapter disk machinable for fitment to various wheels.

13. A non-rotating wheel cap, comprising:
an inner disk attachable to a wheel;
an outer disk rotatably attached to the inner disk;
a pocket of the outer disk;
a weight attachable inside the pocket, the weight and the pocket having the shape of an arc between 90 and 110 degrees, and the pocket circumferentially surrounding the weight; and
an ornamental disk attached to an outer surface of the outer disk.

* * * * *